July 6, 1965  K. A. SCHAFER  3,193,426
ENCAPSULATING ARTICLES WITH RESINOUS MATERIALS
AND TAPES USEFUL THEREFOR
Filed Aug. 16, 1961

INVENTOR.
KENNETH A. SCHAFER
BY Harry B. Keck
ATTORNEY 3,193,426
ENCAPSULATING ARTICLES WITH RESINOUS MATERIALS AND TAPES USEFUL THEREFOR
Kenneth A. Schafer, Cedarburg, Wis., assignor to Freeman Chemical Corporation, Port Washington, Wis., a corporation of Delaware
Filed Aug. 16, 1961, Ser. No. 131,842
5 Claims. (Cl. 156—185)

This invention relates to encapsulating of articles with thermosetting resinous compositions. In one embodiment of this invention, a novel tape is utilized. The invention employs foamed resinous materials which have open, connected cell structures and which are impregnated with a thermosetting resinous composition which fills the void spaces of the foamed resinous materials and is cured to a hardened thermoset condition while confined within the void spaces of the foamed resinous material which is maintained under compression.

The encapsulation art involve the coating of various elements, frequently electrical components such as transformers, resistors, capacitors, coils and the like in thick sheaths of relatively impervious materials. The use of thermosetting resinous compositions as an encapsulating material is widely known. Unsaturated polyester resinous compositions, for example, are well known as encapsulating materials. Various other types of resinous materials also have been utilized in the encapsulation arts.

According to this invention, I provide an initial encapsulation of the article in a sheath of foamed resinous material having open, connected cells. Foamed polyurethane is a preferred foamed resin for this purpose. The foamed resin is impregnated with a thermosetting resinous composition which is cured to a hardened thermoset condition while impregnated within the void spaces of the foamed resin. In a preferred embodiment of this invention, the foamed resin is provided in the form of extensible tape which is wound around the article to be encapsulated. The taped article then is saturated with a suitable thermosetting resinous composition which will "wet" the foamed resin. The thermosetting resinous composition is cured while in the void spaces of the wound tape to a hardened thermoset condition. The foamed resin tape may be impregnated with the thermosetting resinous composition prior to being wound around the article to be encapsulated.

In an alternative embodiment of this invention, the article to be encapsulated is surrounded with a covering of foamed resin having open, connected cells and being impregnated with a suitable thermosetting resinous composition which is thereafter cured. The surrounding foamed resin may be a preformed shape corresponding to the article to be encapsulated or may comprise fragments of the foamed resin which are confined under compression within a suitable container.

Foamed resin

The foamed resinous material, as heretofore mentioned, is preferably foamed flexible polyurethane having open, connected cells. Other materials which have been investigated have been found to be undesirable for want of one or more of the following features:
The foamed resin must possess:
(1) Open-celled configuration;
(2) Flexibility;
(3) Elasticity;
(4) Ready compressibility; and
(5) Wettability with the liquid thermosetting resin.
Polyurethane foam is eminently satisfactory in the above-listed properties where the thermosetting resin is unsaturated polyester resin or epoxy resins.

The preferred foamed resin has cells of substantially uniform diameter in the range of 0.001 to 0.5 inch. The material is provided in sheet form having a thickness from about 0.05 to 2.0 inches in its uncompressed form. Such sheets may be readily compressed to a minor fraction of the uncompressed thickness.

The cells of the foamed resin must be open and connected. Polyurethane foams having open, connected cell structures have been described in U.S. Patent 2,961,710 and Canada Patent 620,248. The cell-wall breakdown described in these references is accomplished through the action of organic solvents and inorganic reagents acting upon the customary closed-cell polyurethane foams.

Thermosetting resins

Unsaturated polyester resins are well-known in the art as a thermosetting resinous material. Such resinous compositions are widely utilized in the encapsulation art. The unsaturated polyester resins usually are solutions of unsaturated polyesters in a polymerizable monomeric solvent such as styrene, vinyl toluene, acrylates, methacrylates and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of the unsaturated polyester are mixed to formulate a typical unsaturated polyester resinous composition. On heating, such compositions form three-dimensional (thermoset) polymeric bonds without substantial shrinkage through application of heat in the presence of a suitable polymerization catalyst such as benzoyl peroxide. Customarily the thermosetting resinous compositions contain suitable pigmentation to present an opaque surface when cured. The precise formulation of unsaturated polyester resinous compositions forms no part of the present invention.

The principal object of this invention is to provide encapsulated articles which are confined in a resinous mass comprising foamed resin having open, connected cells wherein the void spaces are filled with a theormosetting resinous composition in a cured, hardened, thermoset condition.

A further object of this invention is to provide a foamed resin in the form of a tape which impregnated with a thermosetting resinous composition in liquid form for use in wrapping an article to be encapsuated.

A still further object of this invention is to provide foamed resin cups having open, connected cell structure for use in encapsulation of articles.

These and other objects and advantages of this invention will become apparent from the following detailed description by reference to the accompanying drawings in which.

Figure 1:
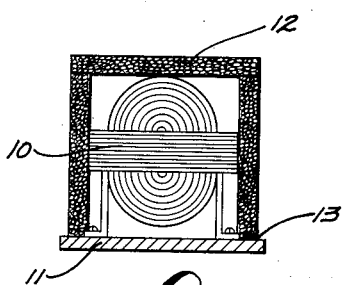
FIGURE 1 is a cross-section illustration of a typical electrical transformer encapsulated in a cup-shaped sheath according to one embodiment of this invention.

Referring to FIGURE 1, there is illustrated an electrical transformer 10 having a base 11. A cup-shaped cover 12 of foamed polyurethane is shown having a rim 13 which engages the base 11. The foamed polyurethane cover 12 preferably is formed by foaming some foamable polyurethane resin in a cup-shaped molding cavity. Thereafter the foamed polyurethane cover 12 is treated to provide open, connected cells. Such treatments are described in the literature supra.

The foamed polyurethane cover 12 is impregnated with a suitable thermosetting resinous composition which will "wet" the polyurethane, such as unsaturated polyester resins and epoxy resins. The impregnated thermosetting resinous composition is cured to a hardened thermoset condition within the void spaces of the foamed polyurethane to provide an impervious cover surrounding the transformer 10.

Figure 2:
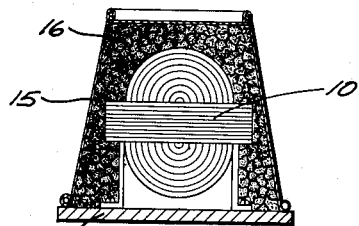
FIGURE 2 is a cross-section illustration of a typical electrical transformer encapsulated in a quantity of fragments of foamed resin according to another embodiment of this invention.

In an alternative embodiment of this invention, as shown in FIGURE 2, the electrical transformer 10 is placed within a container 15 such as a wax-coated drinking cup. The void space between the transformer 10 and the container 15 is filled with fragments 16 of foamed polyurethane having open, connected cells. The fragments 16 are impregnated with a suitable thermosetting resinous composition which is cured to a hardened thermoset condition while the container 15 is in engagement with the base 11 whereby the fragments 15 are maintained under compression. Upon curing of the thermosetting resinous composition, the container 15 is removed to release the encapsulated transformer.

Figure 3:
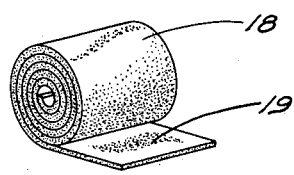
FIGURE 3 is a perspective illustration of a tape roll formed from foamed resin sheets suitable for use in a preferred embodiment of this invention.

A preferred embodiment of this invention utilizes foamed polyurethane having open, connected cells in the form of a tape which is seen in FIGURE 3 as wound in a roll 18. The tape itself 19 may be impregnated with a suitable thermosetting resinous composition in liquid form for use in the present encapsulation process. The foamed polyurethane tape 19 may be free of resin initially. The foamed polyurethane tape 19 may be impregnated with a suitable ethylenically unsaturated monomeric liquid as described in copending application S.N. 131,839 filed on even date herewith.

Figure 4:
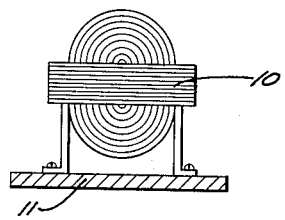
FIGURE 4 is a cross-section illustration of a typical electrical transformer of the type shown in FIGURES 1 and 2.
Figure 5:
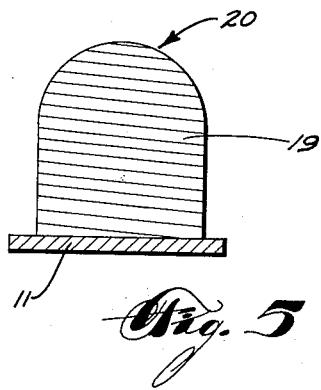
FIGURE 5 is a perspective illustration of the transformer of FIGURE 4 which has been covered with a winding of the tape of FIGURE 3 according to a preferred embodiment of this invention.

The electrical transformer 10 which is shown in FIGURE 4 corresponds to that shown in FIGURES 1 and 2. The tape 19 is wound around the transformer 10 until the transformer 10 is totally enclosed with the tape 19 as seen in FIGURE 5. The wrapped transformer 20 is impregnated with a thermosetting resinous composition in liquid form. The impregnation can be accomplished by dipping the wrapped transformer 20 in a reservoir of the liquid thermosetting resinous composition. The thermosetting resinous composition may be impregnated upon the tape 19 prior to the wrapping of the transformer 10. Regardless of how the wrapped transformer 20 becomes impregnated with the thermosetting resinous composition, the impregnated composition fills the void spaces of the foamed polyurethane. The thermosetting resinous composition is cured to a hardened thermoset condition while confined within the void spaces of the foamed polyurethane. The resulting encapsulated article has an impervious resin coating.

Figure 6:
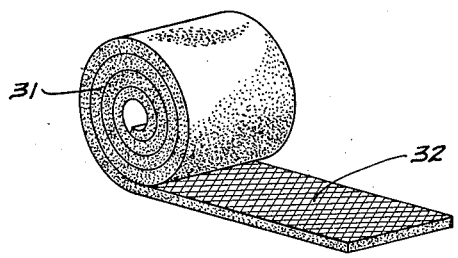
FIGURE 6 is a perspective illustration of a tape roll having an adhesive surface which tape is suitable in the practice of a preferred embodiment of this invention.

If desired, the tape of foamed polyurethane can be provided with an adhesive film over one surface thereof as seen in FIGURE 6. A roll 30 of foamed polyurethane tape 31 is provided with an adhesive film 32. The adhesive film 32 may comprise any of the available pressure-sensitive adhesives such as synthetic rubbers with suitable plasticizers. Where the foamed polyurethane tape 31 is pre-impregnated with a thermosetting resinous composition in liquid form, the adhesive film 32 should be relatively incompatible with the thermosetting resinous composition; vinyl emulsions are suitable as the adhesive in this situation.

I claim:

1. An encapsulating tape comprising a strip of sheet foamed polyurethane having open, connected cells and being impregnated with an unpolymerized, polymerizable thermosetting resinous composition in liquid form.

2. The method of encapsulating an article which comprises wrapping the article with an extensible tape formed from flexible foamed polyurethane having open, connected cells, impregnating the said tape with an unpolymerized, polymerizable thermosetting resinous composition in liquid form, and curing the said thermosetting resinous composition to a hardened, thermoset condition while maintaining the said tape in sheathing relation with the said article whereby the said thermoset resinous material substantially entirely fills the void spaces of the foamed polyurethane.

3. The method of claim 2 wherein the said thermosetting resinous composition is unsaturated polyester resin.

4. The method of claim 2 wherein the said thermosetting resinous composition is an epoxy resin.

5. The method of claim 2 wherein the said foamed polyurethane has cells of substantially uniform diameter in the range of 0.001 to 0.5 inch.

References Cited by the Examiner

UNITED STATES PATENTS

| | | | |
|---|---|---|---|
| 2,599,359 | 6/52 | Banks et al. | 156—307 |
| 2,703,776 | 3/55 | Leader | 161—204 X |
| 2,814,313 | 11/57 | Tate | 156—332 X |
| 2,863,797 | 12/58 | Meyer. | |
| 2,924,546 | 2/60 | Shaw. | |
| 2,927,876 | 3/60 | Hoppe et al. | 161—159 X |
| 2,961,710 | 11/60 | Stark. | |
| 3,038,826 | 6/62 | Medl | 161—184 X |
| 3,039,459 | 6/62 | Scholl | 161—67 X |
| 3,042,545 | 7/62 | Kienle. | |

EARL M. BERGERT, *Primary Examiner.*

CARL M. KRAFFT, *Examiner.*